US010559974B1

(12) United States Patent
Porter et al.

(10) Patent No.: US 10,559,974 B1
(45) Date of Patent: Feb. 11, 2020

(54) CONSTANT POWER OUTPUT FROM EMERGENCY BATTERY PACKS

(71) Applicant: Cooper Technologies Company, Houston, TX (US)

(72) Inventors: Kevin Odith Porter, Peachtree City, GA (US); Daniel Leland Bragg, Peachtree City, GA (US)

(73) Assignee: Eaton Intelligent Power Limited, Dublin (IE)

( * ) Notice: Subject to any disclaimer, the term of this patent is extended or adjusted under 35 U.S.C. 154(b) by 302 days.

(21) Appl. No.: 15/492,405

(22) Filed: Apr. 20, 2017

Related U.S. Application Data

(60) Provisional application No. 62/327,656, filed on Apr. 26, 2016.

(51) Int. Cl.

| | |
|---|---|
| ***H02J 1/10*** | (2006.01) |
| ***H02J 3/38*** | (2006.01) |
| ***H02J 4/00*** | (2006.01) |
| ***H02J 9/06*** | (2006.01) |
| ***H02J 7/00*** | (2006.01) |
| ***H05B 33/08*** | (2020.01) |
| ***H02M 3/335*** | (2006.01) |

(52) U.S. Cl.
CPC .............. *H02J 9/061* (2013.01); *H02J 7/007* (2013.01); *H02J 7/0021* (2013.01); *H02M 3/33523* (2013.01); *H05B 33/0815* (2013.01)

(58) Field of Classification Search
CPC ....................................................... H02J 9/061
See application file for complete search history.

(56) References Cited

U.S. PATENT DOCUMENTS

| | | | | |
|---|---|---|---|---|
| 5,661,645 | A * | 8/1997 | Hochstein | H02J 9/065 363/89 |
| 6,157,168 | A * | 12/2000 | Malik | G06F 1/263 307/66 |
| 2009/0085528 | A1* | 4/2009 | Yamada | H01M 10/44 320/160 |
| 2013/0241503 | A1* | 9/2013 | Galinski, III | H02M 3/1582 323/271 |
| 2014/0312699 | A1 | 10/2014 | Wang | |

OTHER PUBLICATIONS

Iota; LED Emergency Driver Solutions; Brochure Jul. 27, 2016.

* cited by examiner

*Primary Examiner* — Alfonso Perez Borroto
*Assistant Examiner* — Esayas G Yeshaw
(74) *Attorney, Agent, or Firm* — King & Spalding LLP

(57) ABSTRACT

An electrical system can include a power supply that provides primary power, and a light fixture having at least one light source, where the light fixture is coupled to the power supply, where the at least one light source illuminates when the light fixture receives the primary power. The electrical system can further include an energy storage unit having at least one energy storage device that charges using the primary power. The electrical system can also include a controller that determines an initial charging period during which the at least one energy storage device is charged using a constant supply of the primary power, where the controller changes the constant supply of the primary power to a trickle charge of the primary power at the end of the initial charging period to maintain a minimum charge level of the at least one energy storage device.

18 Claims, 5 Drawing Sheets

CONSTANT POWER OUTPUT FROM EMERGENCY BATTERY PACKS

CROSS-REFERENCE TO RELATED APPLICATIONS

This application claims priority under 35 U.S.C. § 119 to U.S. Provisional Patent Application Ser. No. 62/327,656, titled "Constant Power Output From Emergency Battery Packs" and filed on Apr. 26, 2016, the entire contents of which are hereby incorporated herein by reference.

TECHNICAL FIELD

The present disclosure relates generally to emergency battery packs (EBPs), and more particularly to systems, methods, and devices for constant power output from EBPs.

BACKGROUND

Emergency battery packs are used in a number of applications to provide power to electrical devices when a main source of power is interrupted. These emergency battery packs are in communication with the primary source of power, both to ensure that the batteries in the emergency battery pack are charged, and to know when the primary source of power is interrupted.

SUMMARY

In general, in one aspect, the disclosure relates to an electrical system that includes a power supply that provides primary power, and an electrical device having at least one electrical load, where the electrical device is coupled to the power supply, where the at least one electrical load operates when the electrical device receives the primary power. The electrical system can also include an energy storage unit having at least one energy storage device, where the at least one energy storage device charges using the primary power. The electrical system can further include a controller that determines an initial charging period during which the at least one energy storage device is charged using a constant supply of the primary power, where the controller changes the constant supply of the primary power to a trickle charge of the primary power at the end of the initial charging period to maintain a minimum charge level of the at least one energy storage device. The at least one electrical load can receive reserve power from the energy storage unit when the power supply ceases providing the primary power and the trickle charge. The controller can further cause the reserve power delivered by the energy storage unit to be substantially constant over time. The energy storage unit can include a boost converter.

In another aspect, the disclosure can generally relate to an energy storage unit that includes an input channel configured to receive primary power from a power supply, and at least one energy storage device coupled to the input channel, where the at least one energy storage device charges and stores reserve power using the primary power. The energy storage unit can also include a boost converter coupled to the at least one energy storage device, where the boost converter adjusts the reserve power released by the at least one energy storage device. The energy storage unit can further include an output channel coupled to the at least one energy storage device, where the output channel is configured to couple to at least one light source. The energy storage unit can also include a controller coupled to the at least one energy storage device and the boost converter. The controller can determine an initial charging period during which a constant supply of the primary power is used to charge the at least one energy storage device. The controller can also regulate, when the initial charging period expires, the constant supply of the primary power to a trickle charge of the primary power to maintain the at least one energy storage device at the first charge level. The controller can further deliver the reserve power from the at least one energy storage device to the output channel. The reserve power delivered to the output channel by the controller can be substantially constant. The reserve power can be delivered to the output channel when the constant supply of the primary power and the trickle charge of the primary power are interrupted.

In yet another aspect, the disclosure can generally relate to a controller for controlling an energy storage unit. The controller can determine a first period of time during which a constant supply of primary power is used to charge the at least one energy storage device of the energy storage unit. The controller can also regulate, when the first period of time expires, the constant supply of the primary power to a trickle charge of the primary power to maintain the at least one energy storage device at a minimum charge level. The controller can further deliver reserve power from the at least one energy storage device when the constant supply of the primary power and the trickle charge of the primary power are interrupted.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positioning may be exaggerated to help visually convey such principles. In the drawings, reference numerals designate like or corresponding, but not necessarily identical, elements.

DETAILED DESCRIPTION

Figure 1:
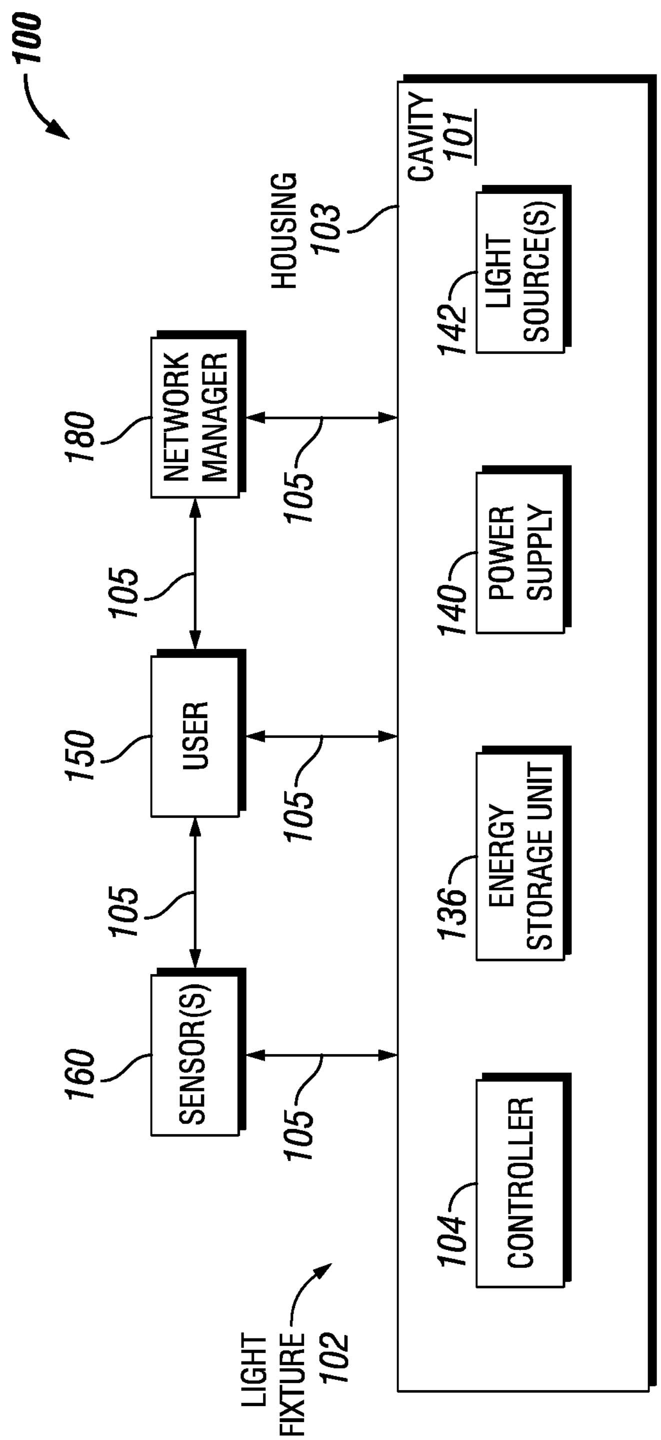
FIG. 1 shows a system diagram of a lighting system that includes a light fixture in accordance with certain example embodiments.

In general, example embodiments provide systems, methods, and devices for constant power output from EBPs. While example embodiments are described herein as being used to provide power to light-emitting diodes (LEDs), example embodiments can also be used to light sources using other types of technology (e.g., halogen, incandescent, sodium vapor, fluorescent). Also, while example embodiments are described herein as being used for light fixtures, example embodiments can be used for any other device that includes one or more components (e.g., LEDs) that have slightly varying power requirements over time. Example constant power output from EBPs can be used in any of a number of applications, including but not limited to electrical enclosures (e.g., control panels) and/or electrical devices (e.g., light fixtures). Further, example constant power output from EBPs can be used in one or more of any of a number of environments, including but not limited to hazardous (e.g., explosive) environments, indoors, outdoors, cold temperatures, hot temperatures, high humidity, marine environments, and low oxygen environments.

A user may be any person that interacts, directly or indirectly, with EBPs. Examples of a user may include, but are not limited to, an engineer, an electrician, an instrumentation and controls technician, a mechanic, an operator, a consultant, a contractor, and a manufacturer's representative. In the foregoing figures showing example embodiments of constant power output from EBPs, one or more of the components shown may be omitted, repeated, and/or substituted. Accordingly, example embodiments of constant power output from EBPs should not be considered limited to the specific arrangements of components shown in any of the figures. For example, features shown in one or more figures or described with respect to one embodiment can be applied to another embodiment associated with a different figure or description. Further, any description of a figure or embodiment made herein stating that one or more components are not included in the figure or embodiment does not mean that such one or more components could not be included in the figure or embodiment, and that for the purposes of the claims set forth herein, such one or more components can be included in one or more claims directed to such figure or embodiment, Example embodiments are designed to control an amount of power supplied to one or more LEDs. Such LEDs can have varying power needs over time. Also, when multiple LEDs are powered by an example EBP, those LEDs can have varying technologies and/or power requirements. Example embodiments can operate continuously, at regular intervals, on-demand, and/or according to some other schedule.

In certain example embodiments, the systems (or portions thereof) that include example EBPs described herein meet one or more of a number of standards, codes, regulations, and/or other requirements established and maintained by one or more entities. Examples of such entities include, but are not limited to, Underwriters' Laboratories (UL), the National Electric Code (NEC), the California Energy Commission (CEC), the Institute of Electrical and Electronics Engineers (IEEE), the Federal Communication Commission (FCC), and the National Fire Protection Association (NFPA).

For example, wiring (the wire itself and/or the installation of such wire) that electrically couples an example EBP (defined below) with a device (e.g., a light fixture) may fall within one or more standards set forth in the NEC. As another example, UL standard 924 addresses requirements (e.g., a minimum amount of light output, a minimum amount of time that the EBP illuminates the light sources) of emergency egress light fixtures and EBPs within such fixtures. As yet another example, the CEC has standards for energy efficiency that requires a charge fed to a battery to be reduced to a trickle charge (also called a pulse charge or a pulse rate charge herein) once the battery is fully charged, either in theory or in actuality.

Example embodiments of constant power output from EBPs will be described more fully hereinafter with reference to the accompanying drawings, in which example embodiments of constant power output from EBPs are shown. Constant power output from EBPs may, however, be embodied in many different forms and should not be construed as limited to the example embodiments set forth herein. Rather, these example embodiments are provided so that this disclosure will be thorough and complete, and will fully convey the scope of constant power output from EBPs to those of ordinary skill in the art. Like, but not necessarily the same, elements (also sometimes called components) in the various figures are denoted by like reference numerals for consistency.

Terms such as "first", "second", "top", "bottom", "side", "width", "length", "inner", and "outer "are used merely to distinguish one component (or part of a component or state of a component) from another. Such terms are not meant to denote a preference or a particular orientation, and are not meant to limit embodiments of constant power output from EBPs. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a system diagram of a lighting system 100 (a form of an electrical system) that includes a light fixture 102 (a form of an electrical device) in accordance with certain example embodiments. In addition to the light fixture 102, the lighting system 100 can include one or more sensors 160 (also sometimes called sensor modules 160), a user 150, and a network manager 180. The light fixture 102 can include a controller 104, an example energy storage unit 136 (another name used herein for an EBP), a power supply 140, and one or more light sources 142 (a form of electrical load). The components shown in FIG. 1 are not exhaustive, and in some embodiments, one or more of the components shown in FIG. 1 may not be included in an example light fixture. Any component of the example light fixture 102 can be discrete or combined with one or more other components of the light fixture 102.

The user 150 is the same as a user defined above. The user 150 can include a user system (not shown), which may include a display (e.g., a GUI). The user 150 can interacts with (e.g., sends data to, receives data from) the light fixture 102 directly and/or a user system. The user 150 can also interact with a network manager 180 and/or one or more of the sensors 160. Interaction between the user 150 and the light fixture 102, the network manager 180, and the sensors 160 is conducted using communication links 105. Each communication link 105 can include wired (e.g., Class 1 electrical cables, Class 2 electrical cables, electrical connectors, power line carrier, DALI, RS485) and/or wireless (e.g., Wi-Fi, visible light communication, cellular networking, Bluetooth, Wireless HART, ISA100) technology. For example, a communication link 105 can be (or include) one or more electrical conductors that are coupled to the housing 103 of the light fixture 102 and to a sensor 160. The communication link 105 can transmit signals (e.g., power signals, communication signals, control signals, data) between the light fixture 102 and the user 150, the network manager 180, and/or one or more of the sensors 160.

The network manager 180 is a device or component that controls all or a portion of a communication network that includes the light fixture 102, additional light fixtures, and the sensors 160 that are communicably coupled to the light fixture 102. As described herein, communication with the network manager 180 can include communicating with one or more other components (e.g., another light fixture) of the system 100. In such a case, the network manager 180 can facilitate such communication.

The one or more sensors 160 can be any type of sensing device that measure one or more parameters. Examples of types of sensors 160 can include, but are not limited to, a voltmeter, an ammeter, an ohmmeter, a passive infrared sensor, a photocell, a pressure sensor, an air flow monitor, a gas detector, and a temperature sensor (e.g., a resistance temperature detector). A parameter that can be measured by a sensor 160 can include, but is not limited to, power (e.g., voltage, current, resistance) at an input channel of the energy storage unit 136, power at an output channel of the energy storage unit 136, an amount of charge of an energy storage device of the energy storage unit 136, motion, an amount of ambient light, temperature within the housing 103 of the light fixture 102, humidity within the housing 103 of the light fixture 102, air quality within the housing 103 of the light fixture 102, vibration, occupancy of a space, and an ambient temperature.

In some cases, the parameter or parameters measured by a sensor 160 can be used by the controller 104 and/or the energy storage unit 136 of the light fixture 102. For example, if a sensor 160 measures the temperature within the housing 103 of the light fixture 102, the controller 104 can send a pulse charge to the energy storage unit 136 a first rate when the temperature measured by the sensor 160 is less than or equal to some temperature (e.g., 35° C.). When the temperature measured by the sensor 160 is greater than (the temperature threshold (e.g., 35° C.), then the controller 104 can send a pulse charge to the energy storage unit 136 at a second rate, which is higher than the first rate. In other words, the controller 104 can recognize that, at higher temperatures, the energy storage unit 136 does not hold its charge as long as at lower temperatures, and so a higher pulse charge rate is used by the controller 104.

Each sensor 160 can use one or more of a number of communication protocols. A sensor 160 can be associated with the light fixture 102 or another light fixture in the system 100. A sensor 160 can be located within the housing 103 of the light fixture 102, disposed on the housing 103 of the light fixture 102, or located outside the housing 103 of the light fixture 102.

The user 150, the network manager 180, and/or the sensors 160 can interact with the light fixture 102 using an application interface in accordance with one or more example embodiments. Such an application interface can receive data (e.g., information, communications, instructions, updates to firmware) from and sends data (e.g., information, communications, instructions) to the user 150, the network manager 180, and/or each sensor 160. Examples of an application interface can include, but are not limited to, a graphical user interface, a touchscreen, an application programming interface, a keyboard, a monitor, a mouse, a web service, a data protocol adapter, some other hardware and/or software, or any suitable combination thereof.

The light fixture 102, the user 150, the network manager 180, and/or the sensors 160 can use their own system or share a system in certain example embodiments. Such a system can be, or contain a form of, an Internet-based or an intranet-based computer system that is capable of communicating with various software. A computer system includes any type of computing device and/or communication device. Examples of such a system can include, but are not limited to, a desktop computer with LAN, WAN, Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 3.

Further, as discussed above, such a system can have corresponding software (e.g., user software, sensor software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, Local Area Network (LAN), Wide Area Network (WAN), or other network communication methods) and/or communication channels, with wire and/or wireless segments according to some example embodiments. The software of one system can be a part of, or operate separately but in conjunction with, the software of another system within the system 100.

The light fixture 102 can include a housing 103. The housing 103 can include at least one wall that forms a cavity 101. In some cases, the housing can be designed to comply with any applicable standards so that the light fixture 102 can be located in a particular environment (e.g., a hazardous environment). The housing 103 of the light fixture 102 can be used to house one or more components of the light fixture 102, including one or more components of the energy storage unit 136, described below with respect to FIG. 2. In alternative embodiments, any one or more of these or other components of the light fixture 102 can be disposed on the housing 103 and/or remotely from the housing 103.

The controller 104 of the light fixture 102 can provide control, communication, and/or other similar signals to one or more other portions (e.g., the energy storage unit 136) of the light fixture 102, the user 150, the network manager 180, and one or more of the sensors 160. Similarly, the controller 104 can receive control, communication, and/or other similar signals from one or more other portions of the light fixture 102, the user 150, the network manager 180, and one or more of the sensors 160. The controller 104 can control each sensor 160 automatically (for example, based on one or more algorithms stored in the controller 104) and/or based on control, communication, and/or other similar signals received from another device through a communication link 105. The controller 104 may include one or more of a number of components (e.g., a hardware processor, memory, a transceiver, an application interface, a security module, a control engine, a timer, a power module, a communication module, a storage repository). Such components can be similar to the corresponding components to the controller 290 of the energy storage unit 136 described below FIG. 2.

As stated above, the controller 104 can include an interface that enables the controller 104 to communicate with one or more components (e.g., power supply 140) of the light fixture 102. For example, if the power supply 140 of the light fixture 102 operates under IEC Standard 62386, then the power supply 140 can have a serial communication interface that will transfer data measured by the sensors 160. In such a case, the controller 104 can also include a serial interface to enable communication with the power supply 140 within the light fixture 102. Such an interface can operate in conjunction with, or independently of, the communication protocols used to communicate between the controller 104 and the user 150, the network manager 180, and the sensors 160.

The controller 104 of the light fixture 102 can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

In certain example embodiments, the controller 104 does not include a hardware processor. In such a case, the controller 104 can include, as an example, one or more field programmable gate arrays (FPGA). Using FPGAs and/or other similar devices known in the art allows the controller 104 (or portions thereof) to be programmable and function according to certain logic rules and thresholds without the use of a hardware processor. Alternatively, FPGAs and/or similar devices can be used in conjunction with one or more hardware processors.

As mentioned above, aside from the controller 104 and its components, the light fixture 102 can include an example power storage unit 136, a power supply 140, and one or more light sources 142. The power storage unit 136 is described below with respect to FIG. 2. The light sources 142 of the light fixture 102 are devices and/or components typically found in a light fixture to allow the light fixture 102 to operate. The light fixture 102 can have one or more of any number and/or type of light sources 142. Examples of such light sources 142 can include, but are not limited to, a local control module, a light source, a light engine, a heat sink, an electrical conductor or electrical cable, a terminal block, a lens, a diffuser, a reflector, an air moving device, a baffle, a dimmer, and a circuit board. A light source 142 can use any type of lighting technology, including but not limited to LED, incandescent, sodium vapor, and fluorescent.

The power supply 140 of the light fixture 102 provides power to one or more of the light sources 142. The power supply 140 can be called by any of a number of other names, including but not limited to a driver, a LED driver, and a ballast. The power supply 140 can include one or more of a number of single or multiple discrete components (e.g., transistor, diode, resistor), and/or a microprocessor. The power supply 140 may include a printed circuit board, upon which the microprocessor and/or one or more discrete components are positioned, and/or a dimmer.

The power supply 140 can include one or more components (e.g., a transformer, a diode bridge, an inverter, a converter) that receives power (for example, through an electrical cable) from a power source (typically external to the light fixture 102, but sometimes integral with the light fixture 102) and generates power of a type (e.g., alternating current, direct current) and level (e.g., 12V, 24V, 120V) that can be used by the light sources 142. In addition, or in the alternative, the power supply 140 can be a source of power in itself. For example, the power supply 140 can be a battery, a localized photovoltaic power system, or some other source of independent power.

As stated above, the light fixture 102 can be placed in any of a number of environments. In such a case, the housing 102 of the light fixture 102 can be configured to comply with applicable standards for any of a number of environments. For example, the light fixture 102 can be rated as a Division 1 or a Division 2 enclosure under NEC standards. Similarly, any of the sensors 160 or other devices communicably coupled to the light fixture 102 can be configured to comply with applicable standards for any of a number of environments. For example, a sensor 160 can be rated as a Division 1 or a Division 2 enclosure under NEC standards.

Figure 2:
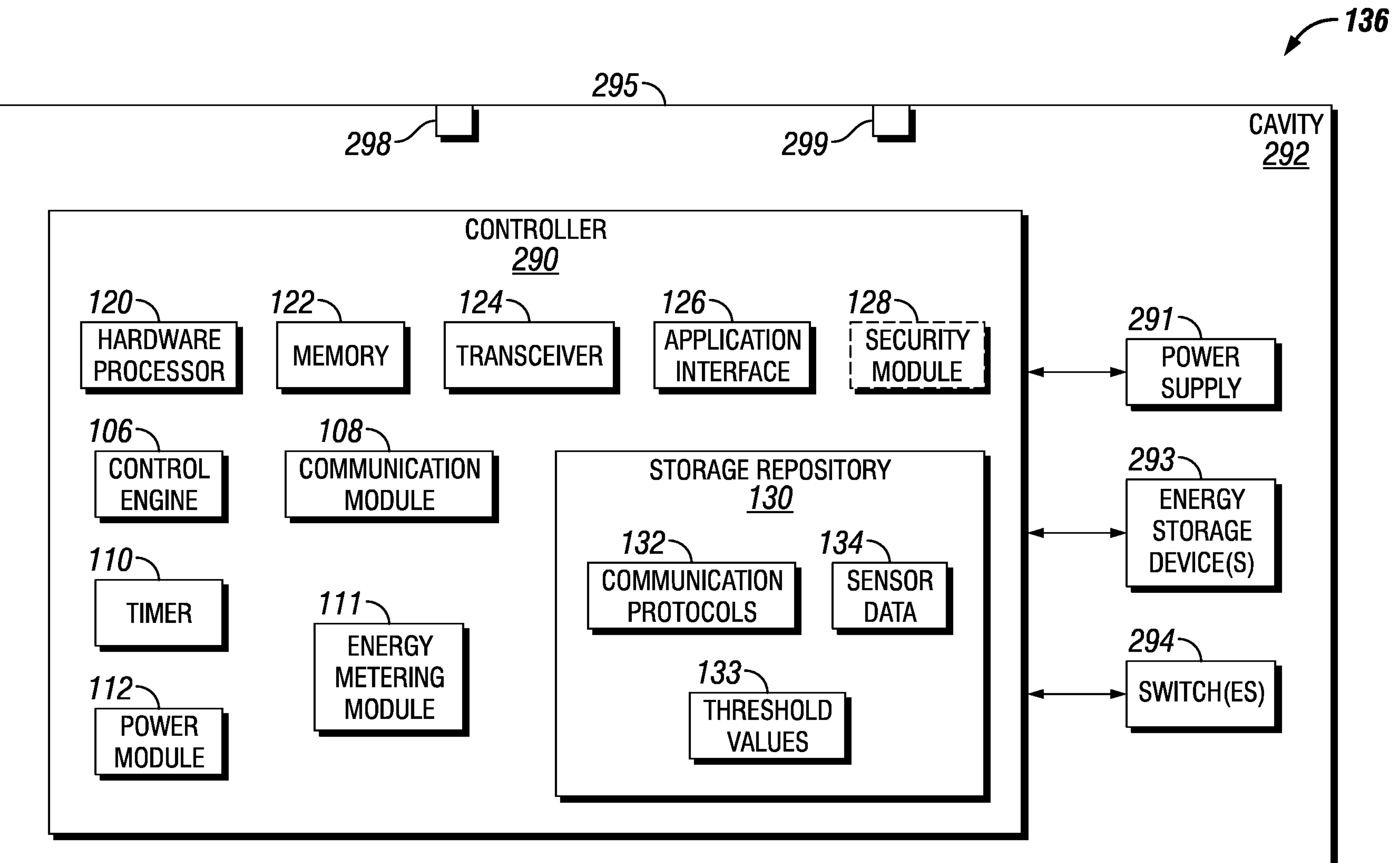
FIG. 2 shows a system diagram of an energy storage unit in accordance with certain example embodiments.

FIG. 2 shows a system diagram of the energy storage unit 136 of FIG. 1 in accordance with certain example embodiments. Referring to FIGS. 1 and 2, the energy storage unit 136 of FIG. 2 can include one or more of a number of components. For example, as shown in FIG. 2, the energy storage unit 136 can include a power supply 291, a controller 290, one or more switches 294, and one or more energy storage devices 293. Any of these components can be located within, on, or external to a housing 295 of the energy storage unit 136. Examples of some other components of the energy storage unit 136 can include, but are not limited to, a non-isolated charger stage and a boost stage.

In certain example embodiments, the power supply 291 of the energy storage unit 136 can be substantially similar to a power supply (e.g., power supply 140) of a light fixture (e.g., light fixture 102). Specifically, the power supply 291 can operate based on signals (e.g., current, voltage, communication, control) that flow through the input channel 298 of the energy storage unit 136. The controller 290 receives such signals and instructs the power supply 291 to operate based on those signals. The power supply 291 can perform some or all of the functions described below with respect to the power module 112. Alternatively, the power supply 291 can be omitted from the energy storage unit 136.

In addition to the power supply 291, one or more of the energy storage devices 293 can receive the signals (sometimes channeled through a switch 294 controlled by the controller 290) that flow through the input channel 298. The signals received by the energy storage devices 293 can be referred to as primary power. If a switch 294 is used to channel the primary power to the energy storage devices 293, the switch 294 can operate based on a level of charge, measured by a sensor 160 and evaluated by the controller 290, of the energy storage device 293. In such a case, the switch 294 can open when an energy storage device 293 do not need charging and that can close when an energy storage device 293 needs to be charged.

Each switch 294 can be any type of device that changes state (e.g., opens, closes) based certain conditions. Examples of a switch can include, but are not limited to, a transistor, a dipole switch, a relay contact, a resistor, and a NOR gate. In certain example embodiments, the switch 294 can operate (e.g., change from a closed position to an open position, change from an open position to a closed position) based on input from the controller 290. As an example, for an initial period of time (e.g., 24 hours), switch 294 remains closed, and thereafter switch 294 will operate in conjunction with the square wave of the duty cycle.

An energy storage device 293 can be any number of rechargeable batteries that are configured to charge using the primary power. In some cases, one or more of the energy storage devices 293 charge using a different level and/or type of power relative to the level and type of power of the primary power. In such a case, the power supply 291 can convert the primary power to the level and type of power used to charge the energy storage devices 293. There can be any number of energy storage devices 293. The energy storage devices 293 can use one or more of any number of battery technologies. Examples of such technologies can include, but are not limited to, nickel-cadmium, nickel-metal hydride, lithium-ion, and alkaline. Aside from a battery, an energy storage device 293 can take on any of a number of other forms known in the art. For example, an energy storage device 293 can include one or more supercapacitors. Each energy storage device 293 of the energy storage unit 136 can be designed to deliver a constant amount of reserve power for some minimum period of time (e.g., 90 minutes).

A switch 294 can be used to allow reserve power discharged by the energy storage devices 293 to flow to the output channel 299 of the energy storage unit 136. In such a case, the switch 294 is open (preventing the energy storage devices 293 from discharging) during times when primary power is received at the input channel 298 and closed (allowing the energy storage devices 293 to discharge) during times when primary power is not received at the input channel 298. In certain example embodiments, such a switch 294 can operate (e.g., change from a closed position to an open position, change from an open position to a closed position) based on input from the controller 290.

In certain example embodiments, the controller 290 monitors the flow of primary power received at the input channel 298 (or at some other location in the light fixture 102) and controls when the primary power stored in the energy storage devices 293 is discharged as reserve power through the output channel 299. The controller 290 can control one or more components (e.g., switch 294) to execute its functions. The controller 290 can be autonomous, self-learning, reporting, controlled by a user 150, controlled by the network manager 180, and/or operate in any of a number of other modes.

The controller 290 of the energy storage unit 136 can be completely stand-alone relative to the controller 104 of the light fixture 102. Alternatively, the controller 290 of the energy storage unit 136 and the controller 104 of the light fixture 102 can be combined into a single controller. As yet another alternative, the controller 290 of the energy storage unit 136 and the controller 104 of the light fixture 102 can share some components (e.g., storage repository 130) while having one or more other stand-alone components (e.g., memory 120, control engine 106) relative to each other.

In certain example embodiments, the controller 290 can include one or more of a number of components. For example, as shown in FIG. 2, such components can include a control engine 106, a communication module 108, a timer 110, a power module 112, an energy metering module 111, a storage repository 130, a hardware processor 120, a memory 122, a transceiver 124, an application interface 126, and a security module 128. The controller 290 can correspond to a computer system 318 as described below with regard to FIG. 3.

The controller 290 can interact with one or more components (e.g., a user 150, the network manager 180, a sensor 160, controller 104) of the system 100 using the application interface 126 in accordance with one or more example embodiments. Specifically, the application interface 126 of the controller 290 receives data (e.g., information, communications, instructions, updates to firmware) from and sends data (e.g., information, communications, instructions) to one or more components of the system 100. The user 150, the controller 104, the network manager 180, and/or each sensor 160 can include an interface to receive data from and send data to the controller 290 in certain example embodiments. Examples of such an interface can include, but are not limited to, a graphical user interface, a touchscreen, a test input, an application programming interface, a keyboard, a monitor, a mouse, a web service, a data protocol adapter, some other hardware and/or software, or any suitable combination thereof.

The controller 290 can use its own system or share a system with one or more components (e.g., controller 104, a user 150, the network manager 180, the sensors 160) of the system. Such a system can be, or contain a form of, an Internet-based or an intranet-based computer system that is capable of communicating with various software. A computer system includes any type of computing device and/or communication device, including but not limited to the controller 290. Examples of such a system can include, but are not limited to, a desktop computer with LAN, WAN, Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 3.

Further, as discussed above, such a system can have corresponding software (e.g., user software, sensor software, controller software, network manager software). The software can execute on the same or a separate device (e.g., a server, mainframe, desktop personal computer (PC), laptop, personal desktop assistant (PDA), television, cable box, satellite box, kiosk, telephone, mobile phone, or other computing devices) and can be coupled by the communication network (e.g., Internet, Intranet, Extranet, Local Area Network (LAN), Wide Area Network (WAN), or other network communication methods) and/or communication channels, with wire and/or wireless segments according to some example embodiments. The software of one system can be a part of, or operate separately but in conjunction with, the software of another system within the system 100.

The energy storage unit 136 can include a housing 295. The housing 295 can include at least one wall that forms a cavity 292. The energy storage unit 136 can be located with, on, or outside of the housing 103 of the light fixture 102. The housing 295 of the energy storage unit 136 can be used to house one or more components of the energy storage unit 136, including one or more components of the controller 290. For example, as shown in FIG. 2, the controller 290 (which in this case includes the control engine 106, the communication module 108, the timer 110, the power module 112, the storage repository 130, the hardware processor 120, the memory 122, the transceiver 124, the application interface 126, and the optional security module 128), the power supply 291, the energy storage devices 293, and the switches 294 are disposed in the cavity 292 formed by the housing 295. In alternative embodiments, any one or more of these or other components of the energy storage unit 136 can be disposed on the housing 295 and/or remotely from the housing 295.

The storage repository 130 can be a persistent storage device (or set of devices) that stores software and data used to assist the controller 290 in communicating with the controller 104, the user 150, the network manager 180, and one or more sensors 160 within the system 100. In one or more example embodiments, the storage repository 130 stores one or more communication protocols 132, threshold values 133, and sensor data 134. The communication protocols 132 can be any of a number of protocols that are used to send and/or receive data between the controller 290 and controller 104, the user 150, the network manager 180, and one or more sensors 160. One or more of the communication protocols 132 can be a time-synchronized protocol. Examples of such time-synchronized protocols can include, but are not limited to, a highway addressable remote transducer (HART) protocol, a wireless HART protocol, and an International Society of Automation (ISA) 100 protocol. In this way, one or more of the communication protocols 132 can provide a layer of security to the data transferred within the system 100.

The threshold values 133 can be one or more values that represent a boundary for a range of acceptable values. The threshold values 133 can represent values for any of a number of parameters, including but not limited to a voltage, a current, an amount of power, an amount of charge in an energy storage device 293, an amount of time, and an amount of resistance. When the controller 290 receives a value (e.g., from the energy metering module 111, from the timer 110, from a sensor 160), the controller 290 can compare that value against one or more of the threshold values 133 to determine an action that should be taken.

Sensor data 134 can be any data associated with (e.g., collected by) each sensor 160 that is communicably coupled to the controller 104 and/or the controller 290. Such data can include, but is not limited to, a manufacturer of the sensor 160, a model number of the sensor 160, communication capability of a sensor 160, power requirements of a sensor 160, and measurements taken by the sensor 160. The sensor data 134 can also include any information associated with devices used by the energy metering module 111.

Examples of a storage repository 130 can include, but are not limited to, a database (or a number of databases), a file system, a hard drive, flash memory, some other form of solid state data storage, or any suitable combination thereof. The storage repository 130 can be located on multiple physical machines, each storing all or a portion of the communication protocols 132, the threshold values 133, and/or the sensor data 134 according to some example embodiments. Each storage unit or device can be physically located in the same or in a different geographic location.

The storage repository 130 can be operatively connected to the control engine 106. In one or more example embodiments, the control engine 106 includes functionality to communicate with the controller 104, the user 150, the network manager 180, and the sensors 160 in the system 100. More specifically, the control engine 106 sends information to and/or receives information from the storage repository 130 in order to communicate with the controller 104, the user 150, the network manager 180, and the sensors 160. As discussed below, the storage repository 130 can also be operatively connected to the communication module 108 in certain example embodiments.

In certain example embodiments, the control engine 106 of the controller 290 controls the operation of one or more components (e.g., the communication module 108, the timer 110, the transceiver 124) of the controller 290. For example, the control engine 106 can activate the communication module 108 when the communication module 108 is in "sleep" mode and when the communication module 108 is needed to send data received from another component (e.g., a sensor 160, the user 150) in the system 100.

As another example, the control engine 106 can acquire the current time using the timer 110. The timer 110 can enable the controller 290 to control the energy storage unit 136 even when the controller 290 has no communication with another component of the system 100. As yet another example, the control engine 106 can direct the energy metering module 111 to measure and send power information (including whether the power supply 140 is generating primary power) of the light fixture 102 to itself or some other component (e.g., the network manager 180) in the system 100.

In certain example embodiments, the control engine 106 of the controller 290 controls the flow of primary power from the input channel 298 to one or more of the energy storage devices 293 of the energy storage unit 136 and/or the flow of reserve power from one or more of the energy storage devices 293 of the energy storage unit 136 to the output channel 299. To control the flow of primary power and/or reserve power, the control engine 106 of the controller 290 operates (e.g., closes, opens) one or more of the switches 294. The control engine 106 can also control one or more switches 294 to determine which particular energy storage devices 293 of the energy storage unit 136 receive primary power and/or release reserve power at a given point in time.

The control engine 106 of the controller 290 determines an initial charging period in certain example embodiments. The initial charging period is when one or more of the energy storage devices 293 of the energy storage unit 136 is charged using a constant supply of primary power. The duration of the initial charging period can be based on one or more of a number of factors, including but not limited to time, an amount of primary power received by one or more of the energy storage devices 293, and a level of charge of one or more of the energy storage devices.

For example, when the initial charging period is based on time, the control engine 106 of the controller 290 can track the time of the initial charging period using the timer 110. In such a case, the control engine 106 of the controller 290 can compare the time measured by the timer 110 against a time threshold (e.g., a threshold value 133). When the time measured by the timer 110 exceeds the time threshold, then the control engine 106 of the controller 290 can end the initial charging period through the operation of one or more switches 294.

As another example, when the initial charging period is based on an amount of primary power that flows to the energy storage devices 293 of the energy storage unit 136, the control engine 106 of the controller 290 can track the amount of primary power using the energy metering module 111. In such a case, the control engine 106 of the controller 290 can compare the amount of primary power measured by the energy metering module 111 against an energy threshold (e.g., a threshold value 133). When the amount of primary power measured by the energy metering module 111 exceeds the energy threshold, then the control engine 106 of the controller 290 can end the initial charging period through the operation of one or more switches 294.

As yet another example, when the initial charging period is based on a level of charge of one or more of the energy storage devices 293 of the energy storage unit 136, the control engine 106 of the controller 290 can track the level of charge using the energy metering module 111. In such a case, the control engine 106 of the controller 290 can compare the level of charge measured by the energy metering module 111 against a target level of charge (e.g., a threshold value 133). When the level of charge measured by the energy metering module 111 exceeds the target level of charge, then the control engine 106 of the controller 290 can end the initial charging period through the operation of one or more switches 294.

As stated above, the initial charging period can be based on more than one factor. For example, if the initial charging period is based on both time and an amount of primary power flowing to the energy storage devices 293 of the energy storage unit 136, then the control engine 106 of the controller 290 can end the initial charging period at the earlier (or, alternatively, the later) of when the time measured by the timer 110 exceeds the time threshold and when the amount of primary power measured by the energy metering module 111 exceeds the energy threshold.

When the control engine 106 of the controller 290 determines that the initial charging period has ended, then the control engine 106 of the controller 290 can operate one or more of the switches 294 to stop the constant flow of primary power to one or more of the energy storage devices 293 of the energy storage unit 136, and to subsequently (e.g., immediately thereafter) allow a trickle charge of primary power to flow to one or more of the energy storage devices 293 of the energy storage unit 136. As discussed above, a trickle charge (also called a pulse charge) is an intermittent flow of primary power.

The purpose of the trickle charge is to keep the level of charge of one or more of the energy storage devices 293 of the energy storage unit 136 above a certain minimum amount (e.g., a threshold value 133). As an energy storage device 293 sits idle, the reserve power that it is holding in charge begins to slowly leek out of the energy storage device 293. If the energy storage device 293 sits idle for too long, the amount of reserve power that it loses can become significant.

The trickle charge is an efficient way to keep the level of charge of an energy storage device above the minimum threshold value. By continuing to send a continuous amount of primary power to the energy storage devices 293, thereby extending the initial charging period, a significant amount of energy is wasted because the energy storage devices 293 no longer have the capacity to store the additional primary power. This inefficiency is an example of what has driven the CEC to enact certain energy conversation efforts, such as what is solved by example embodiments described herein. In the event that a regulatory (e.g., the CEC) and/or standard-making entity (e.g., UL) adds a new regulation or standard, and/or changes an existing regulation or standard that impacts example embodiments described herein, the control engine 106 of the controller 290 can automatically receive such new or updated regulations or standards from the network manager 180 and automatically update its operating protocols (e.g., update its software, store additional information in the storage repository 130) accordingly.

The control engine 106 of the controller 290 can control one or more aspects (e.g., duration, frequency, duty cycle) of the trickle charge based on any one or more of a number of factors. Such factors can include, but are not limited to, time, temperature, minimum charge level threshold of an energy storage device 293, maximum charge capacity of an energy storage device 293, and amount of primary power used. For example, when an aspect (e.g., duration) of a trickle charge to one or more of the energy storage devices 293 is based on time, the control engine 106 of the controller 290 can track the time of trickle charge using the timer 110. In such a case, the control engine 106 of the controller 290 can compare the time measured by the timer 110 against a time threshold (e.g., a threshold value 133). When the time measured by the timer 110 exceeds the time threshold, then the control engine 106 of the controller 290 can end the trickle charge through the operation of one or more switches 294.

As another example, when an aspect (e.g., frequency) of a trickle charge to one or more of the energy storage devices 293 is based on temperature (e.g., the temperature within the housing 103 of the light fixture 102), the control engine 106 of the controller 290 can track the temperature measured by a sensor 160 (e.g., a thermistor, a thermometer, a thermocouple). In such a case, the control engine 106 of the controller 290 can compare the temperature measured by the sensor 160 against a temperature threshold (e.g., a threshold value 133). When the temperature measured by the sensor 160 falls below the temperature threshold (e.g., 35° C.), then the control engine 106 of the controller 290 can employ the trickle charge at a first frequency through the operation of one or more switches 294. Alternatively, when the temperature measured by the sensor 160 exceeds the temperature threshold, then the control engine 106 of the controller 290 can employ the trickle charge at a second (e.g., higher) frequency through the operation of one or more switches 294. The problem solved in this particular example is that an energy storage device 293 loses its charge more quickly when it is exposed to higher temperatures, and so the example control engine 106 makes adjustments to help ensure that the energy storage device 293 will deliver a minimum amount of continuous reserve power for a minimum amount of time, despite the higher temperatures.

When the power supply 140 experiences an outage, the primary power is no longer delivered to the energy storage unit 136. In such a case, the control engine 106 of the controller 290 of the energy storage unit 136 can determine (for example, using the energy metering module 111) that the primary power is no longer being delivered. In some cases, the control engine 106 of the controller 290 can consider that an outage condition of the power supply 140 exists when an amount of primary power delivered to the energy storage unit 136 is greater than zero but falls below some minimum acceptable value (e.g., a threshold value 133).

In any case, when such an outage condition occurs, the control engine 106 of the controller 290 can operate one or more switches 294 to allow reserve power to be released by one or more of the energy storage devices 293 to the output channel 299 of the energy storage unit 136. In some cases, the control engine 106 of the controller 290 can also operate one or more switches 294 to prevent primary power to be delivered to the energy storage devices 293 while the control engine 106 still considers that an outage condition of the power supply 140 exists.

In some cases, the control engine 106 of the controller 104 can control the duty cycle of the reserve power delivered by the energy storage devices 293 to the one or more light sources 142. For example, if the reserve power stored in the at least one energy storage device is reduced, then the control engine 106 can increase the duty cycle of the energy storage devices 293 delivering the reserve power to the one or more light sources 142.

During the outage condition of the power supply 140, the control engine 106 of the controller 290 can manage which and how many of the energy storage devices 293 are utilized at a given point in time. An evaluation of such a management requirement by the control engine 106 can be based on one or more of a number of factors, including but not limited to the amount and type of load being served, the time of day, the day of week, whether the load being served can be adjusted for a reduced output (and so a reduced consumption of reserve power), temperature, and whether the duration of the outage of the power source 140 is known.

When the primary power delivered by the power supply 140 resumes, the control engine 106 of the controller 290 can detect when this occurs (for example, using the energy metering module 111). In such a case, the control engine 106 of the controller 290 can operate one or more switches 294 to prevent the energy storage devices 293 from releasing additional reserve power and allow primary power supplied by the power supply 140 to be delivered to one or more of the energy storage devices 293. When this occurs, the control engine 106 of the controller 290 can initiate a new initial charging period.

Some or all of the components (e.g., the control engine 106) and/or functionality of the controller 290 can be a substitute for and/or a complement of the controller 104, and vice-versa. The control engine 106 can be configured to perform a number of functions that help ensure the reliable operation of the light sources 142 during any of a number of adverse conditions (e.g., power outage, fire, chemical leak). Further, the control engine 106 can be configured to provide substantially constant power from the energy storage unit 136 to the light sources 142 during such adverse conditions.

The control engine 106 can provide control, communication, and/or other similar signals to the controller 104, the user 150, the network manager 180, and one or more of the sensors 160. Similarly, the control engine 106 can receive control, communication, and/or other similar signals from the controller 104, the user 150, the network manager 180, and one or more of the sensors 160. The control engine 106 can control the energy metering module 111 and/or each sensor 160 automatically (for example, based on one or more algorithms stored in the control engine 106) and/or based on control, communication, and/or other similar signals received from another device through a communication link 105. The control engine 106 may include a printed circuit board, upon which the hardware processor 120 and/or one or more discrete components of the controller 104 can be positioned.

In certain example embodiments, the control engine 106 can include an interface that enables the control engine 106 to communicate with one or more components (e.g., power supply 140) of the light fixture 102. For example, if the power supply 140 of the light fixture 102 operates under IEC Standard 62386, then the power supply 140 can include a digital addressable lighting interface (DALI). In such a case, the control engine 106 can also include a DALI to enable communication with the power supply 140 within the light fixture 102. Such an interface can operate in conjunction with, or independently of, the communication protocols 132 used to communicate between the controller 290 and the controller 104, the user 150, the network manager 180, and the sensors 160.

The control engine 106 (or other components of the controller 290) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM). By using the control engine 106 as described herein, the controller 290 can cause the light sources 142 to illuminate in spite of an adverse condition. In other words, if an adverse condition that affects the operation of the light fixture 102 or any portion thereof arises, including the control engine 106, the controller 290 ensures that the light sources 142 of the light fixture 102 emit light using reserve power from the energy storage unit 136.

The communication module 108 of the controller 290 determines and implements the communication protocol (e.g., from the communication protocols 132 of the storage repository 130) that is used when the control engine 106 communicates with (e.g., sends signals to, receives signals from) the controller, the user 150, the network manager 180, and/or one or more of the sensors 160. In some cases, the communication module 108 accesses the sensor data 134 to determine which communication protocol is used to communicate with the sensor 160 associated with the sensor data 134. In addition, the communication module 108 can interpret the communication protocol of a communication received by the controller 290 so that the control engine 106 can interpret the communication.

The communication module 108 can send and receive data between the controller 290 and the network manager 180, the users 150, and the controller 104. The communication module 108 can send and/or receive data in a given format that follows a particular communication protocol 132. The control engine 106 can interpret the data packet received from the communication module 108 using the communication protocol 132 information stored in the storage repository 130. The control engine 106 can also facilitate the data transfer between one or more sensors 160 and the controller 104, the network manager 180, or a user 150 by converting the data into a format understood by the communication module 108.

The communication module 108 can send data (e.g., communication protocols 132, threshold values 133, sensor data 134, operational information, error codes) directly to and/or retrieve data directly from the storage repository 130. Alternatively, the control engine 106 can facilitate the transfer of data between the communication module 108 and the storage repository 130. The communication module 108 can also provide encryption to data that is sent by the controller 290 and decryption to data that is received by the controller 290. The communication module 108 can also provide one or more of a number of other services with respect to data sent from and received by the controller 290. Such services can include, but are not limited to, data packet routing information and procedures to follow in the event of data interruption.

The timer 110 of the controller 290 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can track time periods based on an instruction received from the control engine 106, based on an instruction received from the user 150, based on an instruction programmed in the software for the controller 290, based on some other condition or from some other component, or from any combination thereof.

The timer 110 can be configured to track time when there is no power delivered to the controller 290 (e.g., the power module 112 malfunctions) using, for example, a super capacitor or a battery backup. In such a case, when there is a resumption of power delivery to the controller 290, the timer 110 can communicate any aspect of time to the controller 290. In such a case, the timer 110 can include one or more of a number of components (e.g., a super capacitor, an integrated circuit) to perform these functions.

The energy metering module 111 of the controller 290 measures one or more components of power (e.g., current, voltage, resistance, VARs, watts) at one or more points within or proximate to the light fixture 102. The energy metering module 111 can include any of a number of measuring devices and related devices, including but not limited to a voltmeter, an ammeter, a power meter, an ohmmeter, a current transformer, a potential transformer, a resistor, and electrical wiring. The energy metering module 111 can measure a component of power continuously, periodically, based on the occurrence of an event, based on a command received from the control module 106, and/or based on some other factor.

The power module 112 of the controller 290 provides power to one or more other components (e.g., timer 110, control engine 106) of the controller 290. In addition, in certain example embodiments, the power module 112 can provide power to the power supply 291 of the energy storage unit 136 and/or the power supply 140 of the light fixture 102.

The power module 112 can include one or more of a number of single or multiple discrete components (e.g., transistor, diode, resistor), and/or a microprocessor. The power module 112 may include a printed circuit board, upon which the microprocessor and/or one or more discrete components are positioned. In some cases, the power module 112 can include one or more components that allow the power module 112 to measure one or more elements of power (e.g., voltage, current) that is delivered to and/or sent from the power module 112, The power module 112 can include one or more components (e.g., a transformer, a diode bridge, an inverter, a converter) that receives power from a source (e.g., power supply 140, a power source external to the light fixture 102) and generates power of a type (e.g., alternating current, direct current) and level (e.g., 12V, 24V, 120V) that can be used by the other components of the controller 290 and/or by the power supply 291. In addition, or in the alternative, the power module 112 can be a source of power in itself to provide signals to the other components of the controller 290 and/or the power supply 291. For example, the power module 112 can be a battery. As another example, the power module 112 can be a localized photovoltaic power system. The power module 112 can also have sufficient isolation in the associated components of the power module 112 (e.g., transformers, opto-couplers, current and voltage limiting devices) so that the power module 112 is certified to provide power to an intrinsically safe circuit.

In certain example embodiments, the power module 112 of the controller 290 can also provide power and/or control signals, directly or indirectly, to one or more of the sensors 160. In such a case, the control engine 106 can direct the power generated by the power module 112 to the sensors 160 and/or the power supply 140 of the light fixture 102. In this way, power can be conserved by sending power to the sensors 160 and/or the power supply 140 of the light fixture 102 when those devices need power, as determined by the control engine 106.

The hardware processor 120 of the controller 290 executes software, algorithms, and firmware in accordance with one or more example embodiments. Specifically, the hardware processor 120 can execute software on the control engine 106 or any other portion of the controller 290, as well as software used by the controller 104, the user 150, the network manager 180, and/or one or more of the sensors 160. The hardware processor 120 can be an integrated circuit, a central processing unit, a multi-core processing chip, SoC, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 can include volatile and/or non-volatile memory. The memory 122 is discretely located within the controller 290 relative to the hardware processor 120 according to some example embodiments. In certain configurations, the memory 122 can be integrated with the hardware processor 120.

In certain example embodiments, the controller 290 does not include a hardware processor 120. In such a case, the controller 104 can include, as an example, one or more field programmable gate arrays (FPGA). Using FPGAs and/or other similar devices known in the art allows the controller 104 (or portions thereof) to be programmable and function according to certain logic rules and thresholds without the use of a hardware processor. Alternatively, FPGAs and/or similar devices can be used in conjunction with one or more hardware processors 120.

The transceiver 124 of the controller 290 can send and/or receive control and/or communication signals. Specifically, the transceiver 124 can be used to transfer data between the controller 290 and the controller 104, the user 150, the network manager 180, and/or the sensors 160. The transceiver 124 can use wired and/or wireless technology. The transceiver 124 can be configured in such a way that the control and/or communication signals sent and/or received by the transceiver 124 can be received and/or sent by another transceiver that is part of the controller 104, the user 150, the network manager 180, and/or the sensors 160. The transceiver 124 can use any of a number of signal types, including but not limited to radio signals.

When the transceiver 124 of the controller 290 uses wireless technology, any type of wireless technology can be used by the transceiver 124 in sending and receiving signals. Such wireless technology can include, but is not limited to, Wi-Fi, visible light communication, cellular networking, and Bluetooth. The transceiver 124 can use one or more of any number of suitable communication protocols (e.g., ISA100, HART) when sending and/or receiving signals. Such communication protocols can be stored in the communication protocols 132 of the storage repository 130. Further, any transceiver information for the controller 104, the user 150, the network manager 180, and/or the sensors 160 can be part of the sensor data 134 (or similar areas) of the storage repository 130.

Optionally, in one or more example embodiments, the security module 128 secures interactions between the controller 290, the controller 104, the user 150, the network manager 180, and/or the sensors 160. More specifically, the security module 128 authenticates communication from software based on security keys verifying the identity of the source of the communication. For example, user software may be associated with a security key enabling the software of the user 150 to interact with the controller 290 and/or the sensors 160. Further, the security module 128 can restrict receipt of information, requests for information, and/or access to information in some example embodiments.

Figure 3:
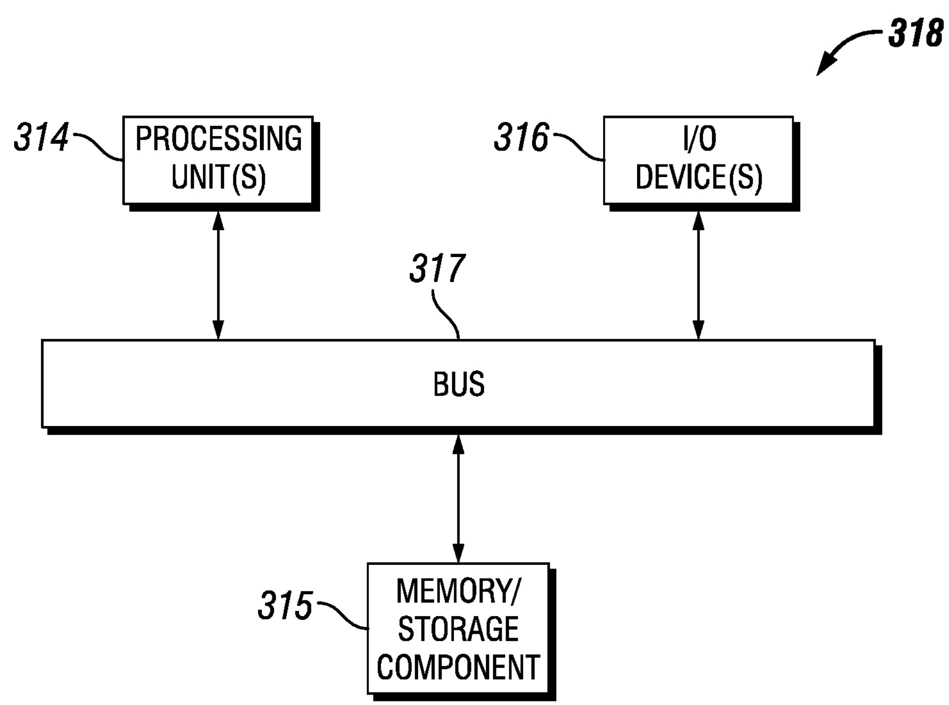
FIG. 3 shows a computing device in accordance with certain example embodiments.

One or more of the functions performed by any of the components (e.g., controller 290) of an example light fixture (e.g., light fixture 102) can be performed using a computing device 318. An example of a computing device 318 is shown in FIG. 3. The computing device 318 implements one or more of the various techniques described herein, and which is representative, in whole or in part, of the elements described herein pursuant to certain example embodiments. Computing device 318 is one example of a computing device and is not intended to suggest any limitation as to scope of use or functionality of the computing device and/or its possible architectures. Neither should computing device 318 be interpreted as having any dependency or requirement relating to any one or combination of components illustrated in the example computing device 318.

Computing device 318 includes one or more processors or processing units 314, one or more memory/storage components 315, one or more input/output (I/O) devices 316, and a bus 317 that allows the various components and devices to communicate with one another. Bus 317 represents one or more of any of several types of bus structures, including a memory bus or memory controller, a peripheral bus, an accelerated graphics port, and a processor or local bus using any of a variety of bus architectures. Bus 317 includes wired and/or wireless buses.

Memory/storage component 315 represents one or more computer storage media. Memory/storage component 315 includes volatile media (such as random access memory (RAM)) and/or nonvolatile media (such as read only memory (ROM), flash memory, optical disks, magnetic disks, and so forth). Memory/storage component 315 includes fixed media (e.g., RAM, ROM, a fixed hard drive, etc.) as well as removable media (e.g., a Flash memory drive, a removable hard drive, an optical disk, and so forth).

One or more I/O devices 316 allow a customer, utility, or other user to enter commands and information to computing device 318, and also allow information to be presented to the customer, utility, or other user and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 318 is connected to a network (not shown) (e.g., a local area network (LAN), a wide area network (WAN) such as the Internet, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 318 includes at least the minimal processing, input, and/or output means necessary to practice one or more embodiments.

Further, those skilled in the art will appreciate that one or more elements of the aforementioned computer device 318 is located at a remote location and connected to the other elements over a network in certain example embodiments. Further, one or more embodiments is implemented on a distributed system having one or more nodes, where each portion of the implementation (e.g., controller 290) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Figure 4A:
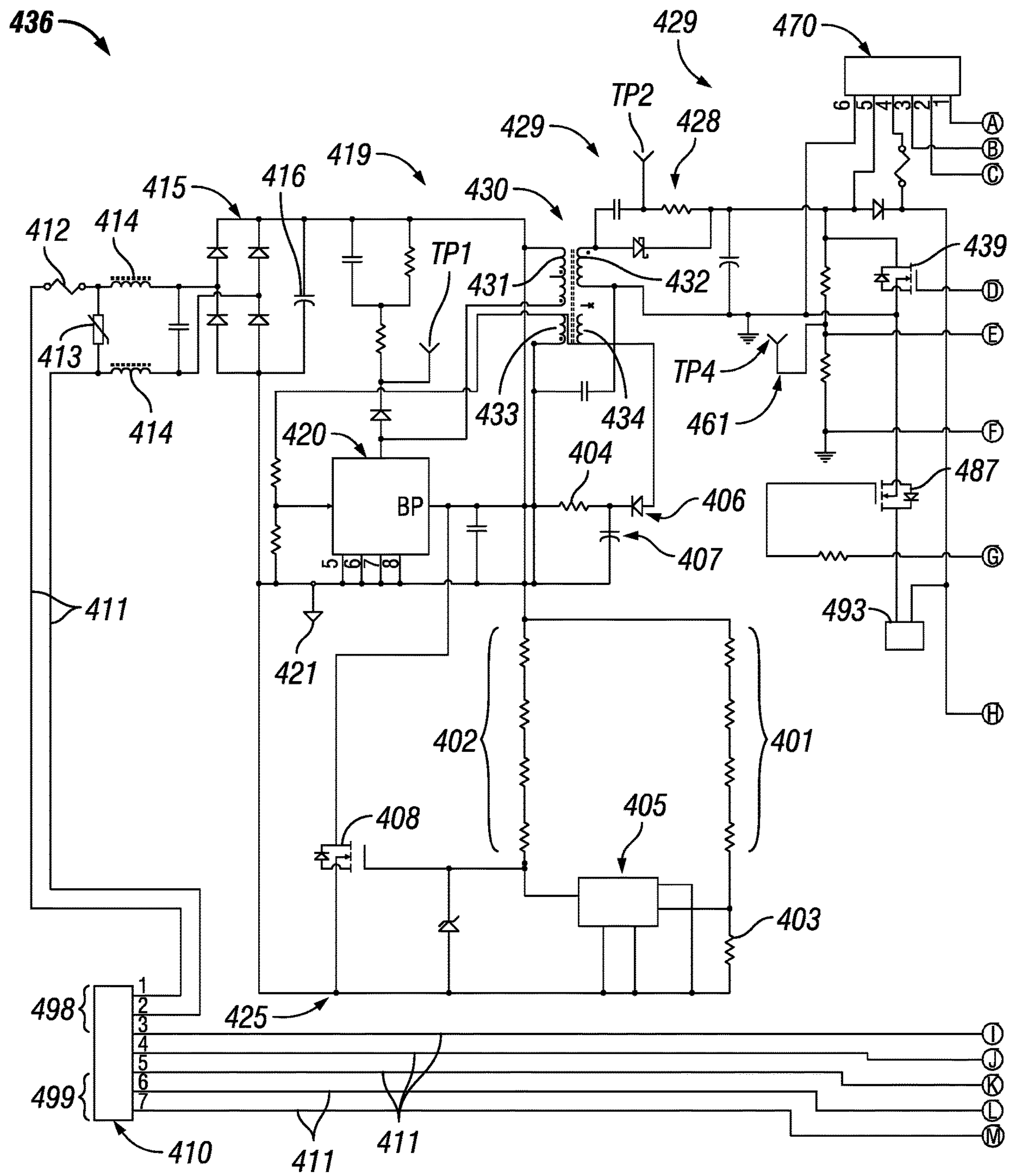
FIGS. 4A and 4B show an energy storage unit to provide constant power to one or more light sources in accordance with certain example embodiments.
Figure 4B:
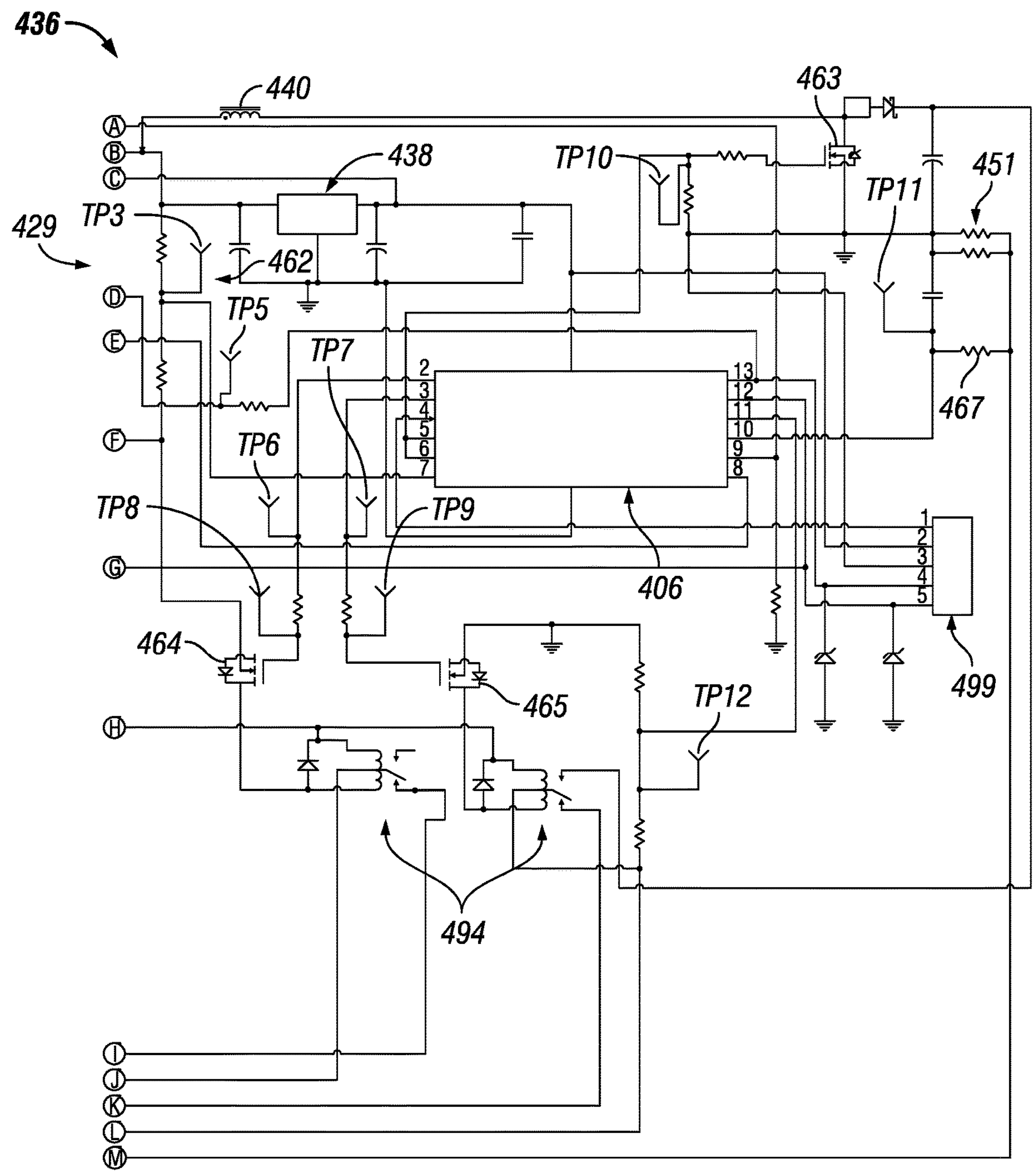

FIGS. 4A and 4B show an energy storage unit 436 to provide constant power to one or more light sources in accordance with certain example embodiments. Specifically, the energy storage unit 436 of FIGS. 4A and 4B is an example of at least a portion (e.g., the control engine 106) of the energy storage unit 136 described above with respect to FIGS. 1 and 2. Referring to FIGS. 1-4B, the energy storage unit 436 can include one or more of a number of components that allow the energy storage unit 436 to provide a substantially constant power output to the light sources (e.g., light sources 142). For example, the energy storage unit 436 of FIGS. 4A and 4B can include a terminal 410, shown in FIG. 4A, that includes electrical conductors 411 for the input power (also called primary power). The input power can be a universal voltage input (e.g., 100 VAC, 300 VAC).

The electrical conductors 411 can lead to a surge protection scheme. In this case, the surge protection is a fuse 412 and a metal-oxide varistor 413. After the surge protection scheme, the energy storage unit 436 can include one or more inductors 414, which provide input filtration for FCC compliance. After the inductors 414, the energy storage unit 436 can include a rectifier 415 that converts the input power (AC) into DC power, which is suitable for use by the rest of the energy storage unit 436. In some cases, such as shown in FIG. 4A, the rectifier 415 is a full wave rectifier that converts sinusoidal AC (the input power) to a rectified AC supply or DC supply having a constant polarity. The rectifier 415 can also be a half-wave rectifier. The rectifier 415 can be a configuration of multiple diodes (as shown, for example, in FIG. 4A), a semiconductor, a transformer, or any other suitable component or set of components.

Once the power is converted to DC by the rectifier 415, the energy storage unit 436 can have a flyback converter 419 which is controlled by a flyback controller 420 (e.g., a constant current/constant voltage control chip). The flyback converter 419 can also include storage capacitance 416 and a flyback transformer 430, as shown in FIG. 4A. The constant current capabilities of the flyback controller 420 can allow for utilizing the same PCBA with multiple voltages for the energy storage devices 493. The energy storage devices 493 can be substantially the same as the energy storage devices 293 discussed above. The constant voltage capabilities of the flyback controller 420 can allow for the energy storage device 493 to be disconnected without having to switch off the conversion. The flyback controller 420 provides a charge current to the energy storage devices 493 when the input power is being received.

In certain example embodiments, as shown in FIG. 4A, the energy storage unit 436 includes brownout detection circuitry 425. In such a case, the brownout detection circuitry 425 can be attached to the primary winding 431 of the flyback transformer 430 and the BP pin of the flyback controller 420. The brownout detection circuitry 425 can include one or more of a number of components. For example, the brownout detection circuitry 425 in FIG. 4A can include one or more resistors (in this case, resistor series 401, resistor series 402, and resistor 403), a controller 405, one or more diodes (in this case, diode 486), and one or more transistors (in this case, transistor 408). The brownout detection circuitry 425 can also include one or more test ports (not shown).

Transistor 408 of the brownout detection circuitry 425 of FIG. 4A can be any type of switch. If the brownout detection circuitry 425 includes one or more transistors (or other form of switch), the transistors can switch off the flyback converter when the input voltage is reduced to a predetermined set point, thus putting the energy storage unit 436 into emergency mode (i.e., supplying the light sources 142 using reserve power provided by the energy storage devices 493). This feature ensures that the energy storage unit 436 goes into emergency mode before the lighting sources 142 are forced to switch off due to insufficient primary power. Using the example configuration of the energy storage unit 436 shown in FIGS. 4A and 4B, the energy storage unit 436 can go into emergency mode without having to use an opto-coupling device (or something functionally equivalent thereto) to send a brownout signal to the secondary side circuitry 429 (the circuitry to the right of the secondary winding 432 of the flyback transformer 430) of the energy storage unit 436.

As another example, when the brownout detection circuitry 425 includes transistor 408 and controller 405, the controller can monitor the input voltage. When the input voltage drops below some threshold value (e.g., 82 VAC, 90 VAC), the controller 405 can switch on the gate of transistor 408, which grounds the BP pin of the flyback controller 420. Grounding the BP pin of the flyback controller 420 stops the flyback and appears as a power failure to the control engine 406. In this way, brownout detection can be achieved without the use of a direct signal to the control engine 406.

In certain example embodiments, to help comply with industry standards (e.g., as set by the CEC), the flyback converter 419 can include one or more components that manage the amount of energy consumed by the flyback controller 420, specifically at the BP pin. For example, as shown in FIG. 4A, the flyback converter 419 can include a resistor 404, a diode 486, and a capacitor 407. These three components can be used to direct energy to the BP pin of the flyback controller 420 and allow the flyback controller 420 consumes less power than if the BP pin of the flyback controller 420 is supplied internally. In addition, Zener diode 486 in this case can be used to clamp the gate voltage of transistor 408, preventing the voltage from rising above the limit of the gate of the transistor 408.

In certain example embodiments, the flyback transformer 430 includes a feedback winding 433 that is attached to the primary ground 421 and the feedback pin FB of the flyback controller 420. The feedback winding 433 supplies a reduced voltage to the feedback pin FB of the flyback controller 420. In some cases, there is an additional coil on the flyback transformer 430 that supplies voltage to the BP pin of the flyback controller 420 and allows the flyback controller 420 to operate at with reduced power consumption. The flyback transformer 430 can also include another feedback winding 434 that is electrically coupled to the components (in this case, the resistor 404, the diode 486, and the capacitor 407) that direct energy to the BP pin of the flyback controller 420.

The output of the flyback circuitry 419 is connected to the secondary side circuitry 429 of the energy storage unit 436. Since the flyback transformer 430 divides the flyback circuitry 419 from the secondary side circuitry 429, there is a physical separation between the flyback circuitry 419 and the secondary side circuitry 429. The secondary side circuitry 429 can include one or more of a number of components and/or features. For example, as shown in FIGS. 4A and 4B, the secondary side circuitry 429 can include a snubber 428 and the energy storage devices 493.

In certain example embodiments, the flyback circuitry 419 can be connected to the secondary side circuitry 429 using an EZ-key with a diode in parallel. This allows for the energy storage devices 493 to be charged while the EZ-key is in place, but prevents any of the reserve power being delivered to the light sources 142 until the EZ-key is removed. A microprocessor-controlled transistor 439 can be connected to the energy storage devices 493. This allows the microprocessor of the transistor 439 to switch off the current going to the energy storage devices 493 under certain conditions. In some cases, such as shown in FIG. 4B, transistor 487 can be positioned between transistor 439 and the energy storage devices 493. In such a case, transistor 487 can be used to block the charging current from going to the energy storage devices 493, which in turn allows the control engine 406 to control the charging of the energy storage devices 493. This can further help example embodiments comply with applicable industry standards, such as those set by the CEC.

The secondary side circuitry 429 can also include a DC-to-DC converter 438 that supplies a constant voltage output to the control engine 406 (substantially similar to the control engine 106 described above), regardless of the voltage output of the flyback circuitry 419. This makes the secondary side circuitry 429 capable of operating with multiple voltages for the energy storage devices 493. In this example, the control engine 406 includes a hardware processor. In addition to power (pin 1) and ground (pin 14) connections, the control engine 406 can also include analog inputs (pins 7 and 8) connected to voltage dividers 461, 462 from the output of the flyback circuitry 419, an analog input (pin 7) for the voltage of the energy storage devices 493, an analog input (pin 9) for a photo resistor (not shown) connected to pins 1 and 2 of terminal block 470, and an analog input (pin 11) for the output voltage of the energy storage devices 493.

The control engine 406 can also include an analog input (pin 10) connected to a current sense resistor 451 (which in this case is two resistors coupled in parallel to each other) to measure the output current of the boost inductor 440 (also called a boost converter 440 herein). By measuring the voltage and current, the control engine 406 can make adjustments to the PWM so that the output 498 of the energy storage unit 436 is at a substantially constant power level.

In certain example embodiments, the control engine 406 also includes outputs (pin 3, pin 12) connected to control relays 494 that controls power to an AC ballast and switch the load of the light sources 142, a transistor 439 that simulates a power failure by shorting the output of the flyback circuitry 419, a transistor (not shown) that controls charging of the energy storage devices 493, and a transistor 463 that provides the switching for the output of the boost inductor 440. The configuration of the relays 494 can vary. For example, the one or more relays 494 can be two coil latching relays. As another example, the relay 494 can be a single coil non-latching relay, in which case the control engine 406 can have a single PWM output to the relay 494.

Using circuits such as those shown in FIGS. 4A and 4B, the control engine 406 can determine when the energy storage devices 493 reach a charge level while being initially charged after an outage has ended. Further, after the initial charging period (e.g., the energy storage devices 493 reach a first charge level, the passage of a period of time, a certain amount of primary power is delivered to the energy storage devices 493), the control engine 406 can provide a trickle charge of the primary power to the energy storage devices 493 to maintain at least a minimum charge level of the energy storage devices 493.

The boost converter 440 (e.g., an inductor) of the secondary side circuitry 429 can be used in lieu of a transformer. If a transformer is used in lieu of the boost converter 440, then the transformer provides reserve power to the light sources 142 when the input power is off. Since the boost converter 440 is an inductor, the energy storage unit 436 can be shorted by shorting the output 498, even if the boost converter 440 is not boosting. By contrast, a transformer in place of the boost converter 440 would prevent the energy storage unit 436 from shorting in such a case. However, the transformer is significantly more expensive than an inductor. Further, ensuring that the output is connected to a light source 142 (e.g., a LED load) that has a $V_f$ (forward voltage) higher than the battery voltage avoids shorting out the energy storage unit 436. The boost converter 440 adjusts (e.g., boosts) the voltage of the reserve power released by the energy storage devices 493.

As discussed above, the energy storage unit 436 can include a PWM function. In such a case, the PWM function can be used to reduce the power consumption of the coils of the relays 494. The control engine 406 can also include analog connections (in this case, pins 12 and 13) for a programming header 499, which allows a user to add to, delete from, and/or modify the programming instructions followed by the control engine 406. The programming instructions in the control engine 406 can be written to monitor the input power (as to check for outages).

If a power outage is detected, the control engine 406 can switch the relay 494 that powers the AC driver (i.e., provides the input power), pause for some period of time (e.g., a couple of seconds), and then switch the relay 494 that moves the light source 142 load from the AC driver to the energy storage unit 436. This switching can occur on the output boost PWM and controls the reserve power to a predetermined constant power level. As discussed above, the reserve power is controlled by the control engine 406 by monitoring the output current and output voltage and adjusting the PWM accordingly.

During discharge of the energy storage devices 493, the control engine 406 monitors the voltage of the energy storage devices 493 and the output of the flyback circuitry 419. The control engine 406 can switch the output 498 off if the voltage of the reserve power released by the energy storage devices 493 reaches some minimum level (e.g., approximately 1 V / cell) or if the control engine 406 detects the input power being restored. If the input power is restored, the control engine 406 switches off the PWM to the boost output, pauses some amount of time (e.g., a couple of seconds), and then switches the supply of the light sources 142 back to the primary power source (in this case, the power supply 140).

In certain example embodiments, the control engine 406 can also monitor an input attached to a sensor 160 (e.g., a photocell). For example, terminals 1 and 2 of the test terminal block 470 can be such an input. In this particular case, terminals 1 and 2 of test terminal block 470 can be a laser test input. When the sensor 160 (e.g., photocell) is activated with a laser pointer, the control engine 406 activates an output that changes the state of a switch (e.g., switches a transistor on or off) and simulates a power failure for a programmed time period (e.g., 30 seconds).

The test terminal block 470 can have other terminals that allow for user input. For example, as shown in FIG. 4B, terminals 5 and 6 of test terminal block 470 can be a switch with a LED, where the LED is on when the input power is on and off when the input power is off, and where the switch can be used to simulate a failure of the input power. As another example, terminals 3 and 4 of test terminal block 470 can be used to disconnect that the energy storage devices 493. In certain example embodiments, aside from the test terminal block 470, one or more other portions of the energy storage unit 436 can have one or more of a number of other test points.

Example embodiments can provide for constant power output to light sources from an energy storage unit during emergency conditions (e.g., a power outage). Example embodiments can meet any applicable standards (e.g., for reliability) for energy storage devices in light fixtures. Further, example embodiments can be designed for more efficient use of materials and less expensive components to deliver the same amount of reliability during emergency conditions. By providing constant power (as opposed to constant current or constant voltage), example embodiments can more efficiently utilize the light sources of a light fixture, thus extending the useful life of the light sources. Example embodiments can be used in retrofit applications of existing circuitry or as part of a new installation.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An electrical system comprising:

a power supply that provides primary power;

an electrical device comprising at least one electrical load, wherein the electrical device is coupled to the power supply, wherein the at least one electrical load operates when the electrical device receives the primary power;

an energy storage unit comprising at least one energy storage device, wherein the at least one energy storage device charges using the primary power; and a controller that determines an initial charging period during which the at least one energy storage device is charged using a constant supply of the primary power, wherein the controller changes the constant supply of the primary power to a trickle charge of the primary power at the end of the initial charging period to maintain a minimum charge level of the at least one energy storage device, wherein the at least one electrical load receives reserve power from the energy storage unit when the power supply ceases providing the primary power and the trickle charge, wherein the controller further causes the reserve power delivered by the energy storage unit to be substantially constant over time, wherein the energy storage unit comprises a boost converter, wherein the reserve power is less than the primary power but greater than a minimum threshold value.

2. The electrical system of claim 1, wherein the electrical device is a light fixture, wherein the at least one electrical load is at least one light source, and wherein the at least one light source comprises a light-emitting diode (LED).

3. The electrical system of claim 1, further comprising:

at least one energy metering module communicably coupled to the controller, wherein the at least one energy metering module measures a forward voltage of the at least one electrical device.

4. The electrical system of claim 3, wherein the at least one energy metering module further measures the primary power delivered to the energy storage unit, wherein the initial charging period is based, at least in part, on an amount of primary power delivered to the energy storage unit.

5. The electrical system of claim 3, wherein the at least one energy metering module further measures a plurality of charge levels of the at least one energy storage device, wherein the plurality of charge levels includes the minimum charge level.

6. The electrical system of claim 1, wherein the controller increases a duty cycle of the at least one energy storage device delivering the reserve power to the at least one electrical load as the reserve power stored in the at least one energy storage device is reduced.

7. The electrical system of claim 6, wherein the duty cycle for providing the trickle charge to the at least one energy storage device is increased by the controller when a temperature measured by a temperature measuring device exceeds a threshold temperature.

8. The electrical system of claim 1, wherein the energy storage unit further comprises a flyback converter for receiving the primary power from the power supply.

9. The electrical system of claim 8, wherein the flyback converter comprises a transformer, wherein the transformer comprises a primary winding and a secondary winding that are electrically isolated from each other.

10. The electrical system of claim 8, wherein the flyback converter turns off when the power supply stops delivering the primary power to the energy storage unit.

11. The electrical system of Claim 1, wherein flow of the constant supply of the primary power, the trickle charge of primary power, and the reserve power is regulated by a plurality of switches controlled by the controller.

12. The electrical system of claim 1, wherein the initial charging period is based, at least in part, on an amount of time measured by a timer, wherein the timer is communicably coupled to the controller.

13. The electrical system of claim 1, wherein the initial charging period begins when the delivery of the primary power by the power supply resumes.

14. An energy storage unit comprising:

an input channel configured to receive primary power from a power supply;

at least one energy storage device coupled to the input channel, wherein the at least one energy storage device charges and stores reserve power using the primary power;

a boost converter coupled to the at least one energy storage device, wherein the boost converter adjusts the reserve power released by the at least one energy storage device;

an output channel coupled to the at least one energy storage device, wherein the output channel is configured to couple to at least one light source;

a controller coupled to the at least one energy storage device and the boost converter, wherein the controller:

determines an initial charging period during which a constant supply of the primary power is used to charge the at least one energy storage device;

regulates, when the initial charging period expires, the constant supply of the primary power to a trickle charge of the primary power to maintain the at least one energy storage device at the first charge level; and delivers the reserve power from the at least one energy storage device to the output channel; and an energy measurement device coupled to the controller, wherein the energy measurement device measures a first amount of reserve power used by the at least one light source, wherein the reserve power delivered to the output channel by the controller is substantially constant, and wherein the reserve power is delivered to the output channel when the constant supply of the primary power and the trickle charge of the primary power are interrupted.

15. The energy storage unit of claim 14, wherein the reserve power is kept at substantially the first amount by the controller using measurements made by the energy measurement device.

16. The energy storage unit of claim 14, further comprising:

a test input coupled to the controller, wherein the test input is configured to receive a signal from a user simulating a loss of the primary power at the input terminal.

17. A controller for controlling an energy storage unit, the controller comprising:

a control engine that follows a plurality of instructions to:

determine a first period of time during which a constant supply of primary power is used to charge at least one energy storage device of the energy storage unit;

regulate, when the first period of time expires, the constant supply of the primary power to a trickle charge of the primary power to maintain the at least one energy storage device at a minimum charge level; and deliver reserve power from the at least one energy storage device when the constant supply of the primary power and the trickle charge of the primary power are interrupted, wherein the reserve power is less than the primary power but greater than a minimum threshold value.

18. The controller of claim 17, further comprising:

a memory that stores the plurality of instructions; and a hardware processor that executes the plurality of instructions for the control engine.

* * * * *